(12) United States Patent
Takahashi

(10) Patent No.: US 12,731,730 B2
(45) Date of Patent: Sep. 8, 2026

(54) CAPACITOR MODULE

(71) Applicant: Murata Manufacturing Co., Ltd., Nagaokakyo (JP)

(72) Inventor: Nobuyuki Takahashi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 377 days.

(21) Appl. No.: 18/396,010

(22) Filed: Dec. 26, 2023

(65) Prior Publication Data

US 2024/0170209 A1 May 23, 2024

Related U.S. Application Data

(63) Continuation of application No. PCT/JP2022/022168, filed on May 31, 2022.

(30) Foreign Application Priority Data

Jul. 1, 2021 (JP) ................................ 2021-110235

(51) Int. Cl.
*H01G 2/02* (2006.01)
*H01G 4/236* (2006.01)
*H01G 4/38* (2006.01)

(52) U.S. Cl.
CPC ............... *H01G 2/02* (2013.01); *H01G 4/236* (2013.01); *H01G 4/38* (2013.01)

(58) Field of Classification Search
CPC ............. H01G 4/38; H01G 4/236; H01G 2/02
See application file for complete search history.

(56) References Cited

U.S. PATENT DOCUMENTS 9,756,755 B2 9/2017 Harada et al.
10,984,952 B2 4/2021 Tomita et al.
2015/0348710 A1* 12/2015 Sato ........................ H01G 2/04 29/25.42
2016/0128216 A1 5/2016 Harada et al.
(Continued)

FOREIGN PATENT DOCUMENTS

CN 105576996 A 5/2016
CN 111386583 A 7/2020
(Continued)

OTHER PUBLICATIONS

International Search Report in PCT/JP2022/022168, mailed Aug. 23, 2022, 2 pages.

*Primary Examiner* — David M Sinclair
(74) *Attorney, Agent, or Firm* — ArentFox Shiff LLP

(57) ABSTRACT

A capacitor module that includes: a case having a bottom surface and a side surface extending from the bottom surface to define an opening that faces the bottom surface, and the side surface including a through hole; one or more of capacitors in the case; a capacitor connection bus bar connected to an electrode of the one or more capacitors; a terminal bus bar extending through the through hole, and includes a first end inside the case and a second end outside the case, the first end being connected to the capacitor connection bus bar; and a sealing resin filled in the case, wherein the capacitor connection bus bar includes a connector, and at least a part of the connector is inclined in a direction from the opening toward the bottom surface of the case and connected to the first end of the terminal bus bar.

20 Claims, 18 Drawing Sheets

(56) References Cited

U.S. PATENT DOCUMENTS

| | | | | |
|---|---|---|---|---|
| 2020/0251282 | A1 | 8/2020 | Tomita et al. | |
| 2024/0371574 | A1* | 11/2024 | Jogan | H01G 4/38 |

FOREIGN PATENT DOCUMENTS

| | | | | | |
|---|---|---|---|---|---|
| JP | 2004146724 | A | | 5/2004 | |
| JP | 2009111158 | A | | 5/2009 | |
| JP | 2011077232 | A | * | 4/2011 | |
| JP | 2012044097 | A | | 3/2012 | |
| JP | 2015088633 | A | | 5/2015 | |
| WO | WO-2018159230 | A1 | * | 9/2018 | H01G 4/38 |
| WO | WO-2022009680 | A1 | * | 1/2022 | H01G 4/38 |
| WO | WO-2022054729 | A1 | * | 3/2022 | H01G 4/32 |

* cited by examiner

CAPACITOR MODULE

CROSS REFERENCE TO RELATED APPLICATIONS

The present application is a continuation of International application No. PCT/JP2022/022168, filed May 31, 2022, which claims priority to Japanese Patent Application No. 2021-110235, filed Jul. 1, 2021, the entire contents of each of which are incorporated herein by reference.

TECHNICAL FIELD

The present invention relates to a capacitor module.

BACKGROUND ART

A capacitor module including a case that houses a capacitor and is filled with a resin is known. In such a capacitor module, a structure in which a bus bar penetrates a side wall of a case and is led out to the outside has been studied.

For example, a capacitor housed in a case described in Patent Document 1 is formed by connecting a capacitor element and an electrode plate, then inserting a connection terminal of the electrode plate in a through hole provided in a case side wall, and then filling a resin in the case.

Patent Document 1: JP-A-2009-111158

SUMMARY OF THE INVENTION

A capacitor housed in a case described in Patent Document 1 still has room for improvement in terms of easiness of assembly.

The present invention provides a capacitor module that can be easily assembled.

Solutions to the Problems

A capacitor module according to one aspect of the present invention includes: a case having a bottom surface and a side surface extending from the bottom surface to define an opening that faces the bottom surface, and the side surface including a through hole; one or more of capacitors in the case; a capacitor connection bus bar connected to an electrode of the one or more capacitors; a terminal bus bar extending through the through hole, and includes a first end inside the case and a second end outside the case, the first end being connected to the capacitor connection bus bar; and a sealing resin filled in the case, wherein the capacitor connection bus bar includes a connector, and at least a part of the connector is inclined in a direction from the opening toward the bottom surface of the case and connected to the first end of the terminal bus bar.

The present invention enables providing a capacitor module that can be easily assembled.

DETAILED DESCRIPTION

Circumstances Leading to Present Invention

Figure 1:
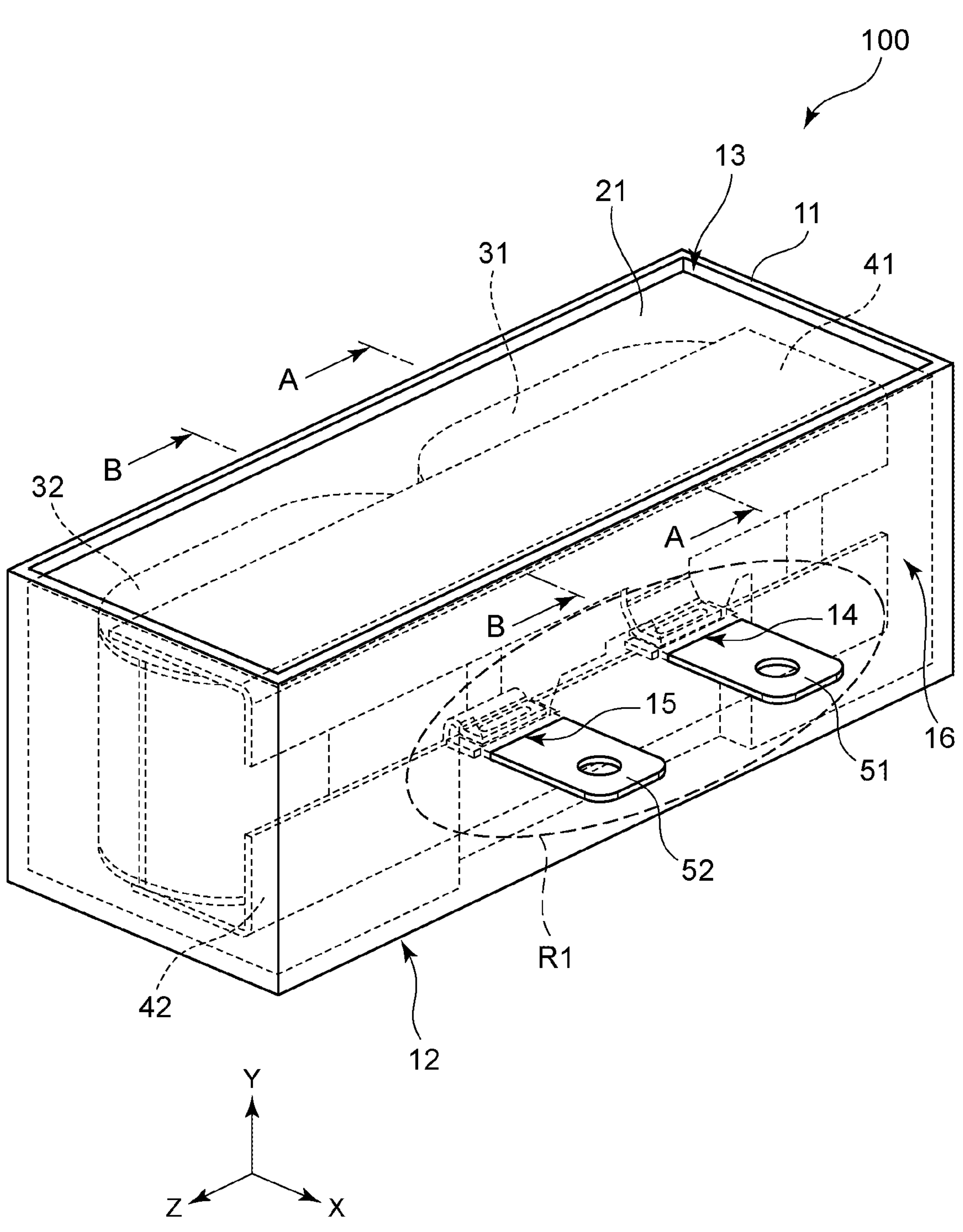
FIG. 1 is a perspective view of a capacitor module according to a first embodiment.

In a capacitor module in which one or more of capacitors are housed in a case and a resin is filled in the case, there is a demand for disposing a connection terminal on a side surface of the case. To meet this demand, it has been studied to expose the connection terminal through the side wall of the case by connecting a capacitor element and an electrode plate and passing the connection terminal of the electrode plate through a through hole provided in the side wall of the case, which is similar to the capacitor housed in the case described in Patent Document 1.

However, the capacitor housed in the case described in Patent Document 1 has a problem that the resin may leak from the through hole in a side wall of the case. In order to suppress leakage of resin from the through hole of the case, it has been studied to provide the case with a structure that prevents leakage of resin, but this makes the case structure complicated, and thus increases the number of manufacturing steps, which raises the manufacturing cost. Moreover, the size of the case increases.

In this regard, the present inventors have studied a capacitor module that can be easily assembled, and have conceived the following invention.

A capacitor module according to one aspect of the present disclosure includes: a case having a bottom surface and a side surface extending from the bottom surface to define an opening that faces the bottom surface, and the side surface including a through hole; one or more of capacitors in the case; a capacitor connection bus bar connected to an electrode of the one or more capacitors; a terminal bus bar extending through the through hole, and includes a first end inside the case and a second end outside the case, the first end being connected to the capacitor connection bus bar; and a sealing resin filled in the case, wherein the capacitor connection bus bar includes a connector, and at least a part of the connector is inclined in a direction from the opening toward the bottom surface of the case and connected to the first end of the terminal bus bar.

With this configuration, a capacitor module that can be easily assembled can be provided.

The connector may include a contact part that makes surface contact with the first end of the terminal bus bar, and an extending part extending from the contact part in a direction away from the terminal bus bar.

With such a configuration, the capacitor connection bus bar and the terminal bus bar can be connected more reliably.

The extending part may have a shape in which a distance from a plane on which the contact part extends is larger with increasing distance from the terminal bus bar.

Such a configuration easily allows the contact part and the terminal bus bar making contact with each other by a wider area.

The connector may include a pressing part and a spring part, and the first end of the terminal bus bar may be sandwiched between the pressing part and the spring part.

With such a configuration, the terminal bus bar can be sandwiched between the connectors to further reliably connect the capacitor connection bus bar and the terminal bus bar to each other.

The pressing part may be located on a first side of the terminal bus bar closer to the opening of the case, and the spring part may be located on a second side of the terminal bus bar closer to the bottom surface of the case.

With such a configuration, the terminal bus bar can be sandwiched between the connectors to further reliably connect the capacitor connection bus bar and the terminal bus bar to each other.

The first end of the terminal bus bar may be inclined in a first direction from the bottom surface toward the opening of the case, and the pressing part may be inclined in a second direction from the opening toward the bottom surface of the case.

With such a configuration, the first end of the terminal bus bar can be easily sandwiched between the pressing part and the spring part, and this makes the assembling of the capacitor module easy.

The connector and the first end of the terminal bus bar may be connected by a weld.

With such a configuration, the connector and the terminal bus bar can be joined to each other by a small area. This reduces a contact part between the connector and the terminal bus bar, thereby contributing to the downsizing of the capacitor module.

The case may include a base located closer to the bottom surface than the through hole, and the first end of the terminal bus bar is on the base.

With such a configuration, the connector and the first end can be supported by the base, and the capacitor connection bus bar and the terminal bus bar can be connected more reliably.

The base may be disposed so as to sandwich the through hole, and include slopes inclined toward the through hole.

With such a configuration, the connector can be guided toward the through hole.

The through hole may be a first through hole, the side surface of the case may include a second through hole, the capacitor connection bus bar may be a first capacitor connection bus bar, and the electrode may be a first electrode, and the capacitor module may further include a second capacitor connection bus bar connected to a second electrode of the one or more capacitors; and a second terminal bus bar extending through the second through hole, and includes a third end inside the case and a fourth end outside the case, the third end being connected to the second capacitor connection bus bar, wherein the second capacitor connection bus bar includes a second connector, and at least a part of the second connector is inclined in a direction from the opening toward the bottom surface of the case and connected to the third end of the second terminal bus bar.

With such a configuration, the two terminal bus bars of the capacitor module are exposed to the outside through the side surface of the case, thereby allowing the two terminal bus bars to be exposed to the outside without passing through the opening of the case. Therefore, the length of the terminal bus bar is shortened, and the ESL of the capacitor module can be reduced.

First Embodiment

[Overall Configuration]

Figure 2:
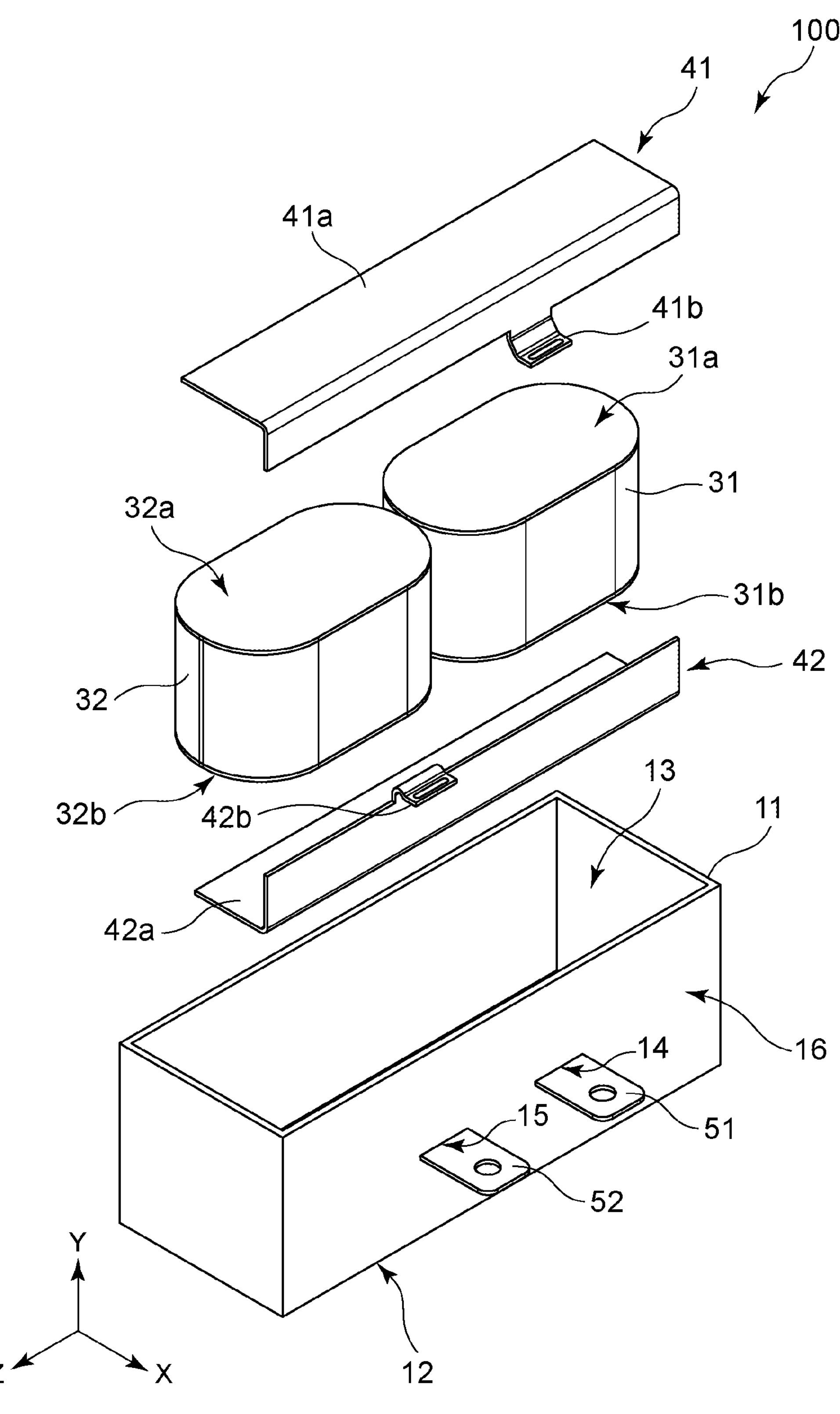
FIG. 2 is an exploded perspective view of the capacitor module in FIG. 1.

FIG. 1 is a perspective view of a capacitor module 100 according to a first embodiment. FIG. 2 is an exploded perspective view of the capacitor module 100 in FIG. 1. In FIG. 2, sealing resin 21 is omitted. Note that X, Y, and Z directions in the drawing respectively indicate lateral direction, height direction, and longitudinal direction of the capacitor module 100.

As illustrated in FIGS. 1 and 2, the capacitor module 100 includes a case 11, the sealing resin 21, capacitors 31 and 32, capacitor connection bus bars 41 and 42, and terminal bus bars 51 and 52. In the capacitor module 100, the case 11 houses the capacitors 31 and 32 and the capacitor connection bus bars 41 and 42, and the inside of the case 11 is filled with the sealing resin 21.

Hereinafter, the capacitor connection bus bar 41 is referred to as a first capacitor connection bus bar 41, and the capacitor connection bus bar 42 is referred to as a second capacitor connection bus bar 42. The terminal bus bar 51 is referred to as a first terminal bus bar 51, and the terminal bus bar 52 is referred to as a second terminal bus bar 52.

The case 11 has a bottom surface 12, and an opening 13 facing the bottom surface 12. Two through holes 14 and 15 are formed in a side surface 16 of the case 11. The first terminal bus bar 51 is disposed and positioned in the first through hole 14, and the second terminal bus bar 52 is disposed and positioned in the second through hole 15.

The inside of the case 11 is filled with the sealing resin 21 to seal therein the capacitors 31 and 32, the capacitor connection bus bars 41 and 42, and part of the terminal bus bars 51 and 52. The sealing resin 21 is a thermosetting resin, and for example, an epoxy resin, a urethane resin, or the like can be used as the sealing resin 21.

The capacitor 31 includes a first electrode 31*a* and a second electrode 31*b*, and the capacitor 32 includes a first electrode 32*a* and a second electrode 32*b*. The capacitors 31 and 32 are film capacitors, for example, and are each formed by winding a dielectric film on which surface a metal-evaporated film is formed and pressing a wound body of the dielectric film into a flat shape.

As illustrated in FIG. 2, the capacitors 31 and 32 are housed in the case 11 such that the first electrodes 31*a* and 32*a* face the opening 13 of the case 11, and the second electrodes 31*b* and 32*b* face the bottom surface 12 of the case 11.

The first capacitor connection bus bar 41 electrically connects the first electrodes 31*a* and 32*a* of the capacitors 31 and 32 to the first terminal bus bar 51. The second capacitor connection bus bar 42 electrically connects the second electrodes 31*b* and 32*b* of the capacitors 31 and 32 to the second terminal bus bar 52.

The first capacitor connection bus bar 41 includes a main body 41_a_ connected to the first electrodes 31_a_ and 32_a_ of the capacitors 31 and 32, and a connector 41_b_ connected to the first terminal bus bar 51. Similarly, the second capacitor connection bus bar 42 includes a main body 42_a_ connected to the second electrodes 31_b_ and 32_b_ of the capacitors 31 and 32, and a connector 42_b_ connected to the second terminal bus bar 52.

The first capacitor connection bus bar 41 and the second capacitor connection bus bar 42 are formed in a plate shape.

The main body 41_a_ of the first capacitor connection bus bar 41 is formed in a plate shape, and is connected to the first electrodes 31_a_ and 32_a_ of the capacitors 31 and 32. The main body 42_a_ of the second capacitor connection bus bar 42 is formed in a plate shape, and is connected to the second electrodes 31_b_ and 32_b_ of the capacitors 31 and 32.

The connector 41_b_ of the first capacitor connection bus bar 41 is formed in a plate shape, and is brought into contact with the first terminal bus bar 51 to be electrically connected to the first terminal bus bar 51. The connector 42_b_ of the second capacitor connection bus bar 42 is formed in a plate shape, and is brought into contact with the second terminal bus bar 52 to be electrically connected to the second terminal bus bar 52. The connectors 41_b_ and 42_b_ will be described in detail later. The first capacitor connection bus bar 41 and second capacitor connection bus bar 42 are formed of a plate-like conductive member such as a metal plate.

Figure 3:
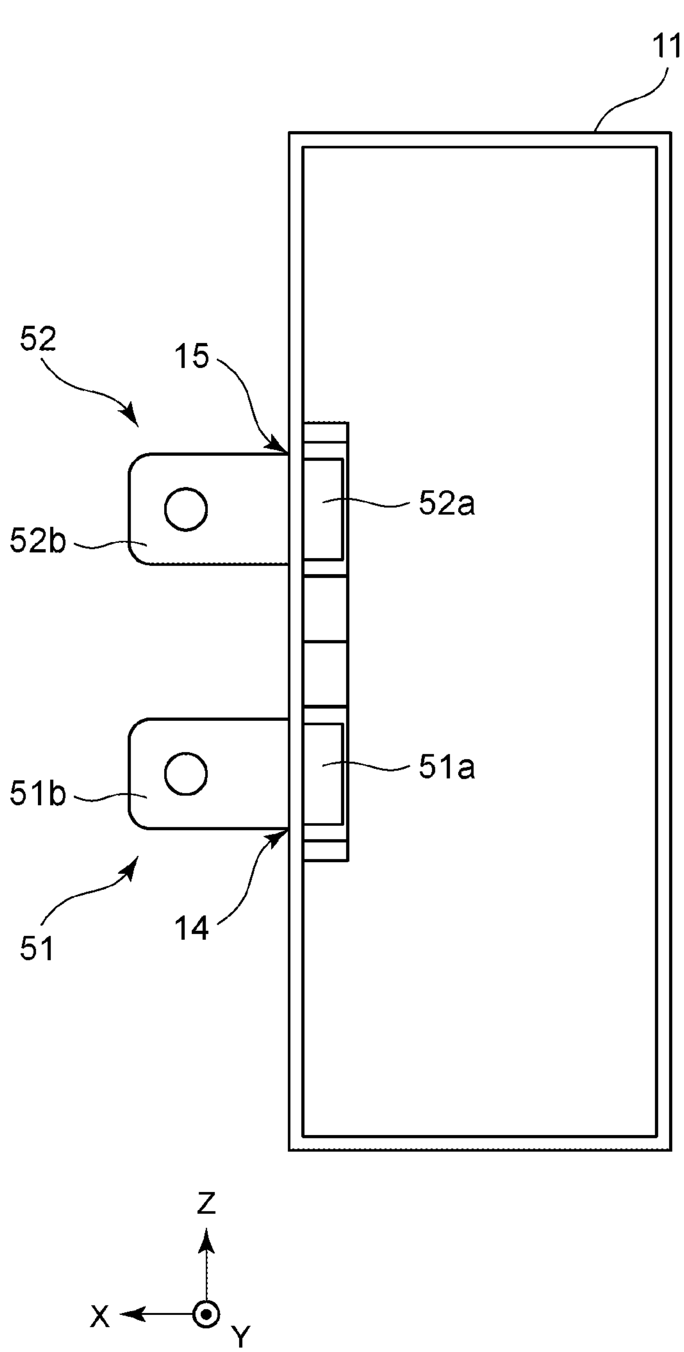
FIG. 3 is a view of a case and terminal bus bars as viewed from an opening of the case.

The first terminal bus bar 51 and the second terminal bus bar 52 are terminals for electrically connecting the capacitor module 100 to an external module or the like. FIG. 3 is a view of the case 11 and the terminal bus bars 51 and 52 as viewed from the opening of the case 11. In FIG. 3, components other than the case 11 and the terminal bus bars 51 and 52 are omitted. The terminal bus bars 51 and 52 will be described with reference to FIG. 3.

The first terminal bus bar 51 is positioned by the first through hole 14. In other words, the first terminal bus bar 51 is inserted in the first through hole 14 without any gap. A first end 51_a_ of the first terminal bus bar 51 is located inside the case 11, and a second end 51_b_ is located outside the case 11. The second terminal bus bar 52 is positioned by the second through hole 15. In other words, the second terminal bus bar 52 is inserted in the second through hole 15 without any gap. A first end 52_a_ of the second terminal bus bar 52 is located inside the case 11, and a second end 52_b_ is located outside the case 11.

The case 11, the first terminal bus bar 51, and the second terminal bus bar 52 are integrally formed by, for example, insert molding. Therefore, the first through hole 14 and the second through hole 15 of the case 11 are respectively plugged by the first terminal bus bar 51 and the second terminal bus bar 52 without any gap. That is, the first terminal bus bar 51 is in contact with the entire circumference of the inner edge of the first through hole 14 formed in the case 11, and the second terminal bus bar 52 is in contact with the entire circumference of the inner edge of the second through hole 15 formed in the case 11. As compared with a configuration in which the case 11 and the terminal bus bars 51 and 52 are formed separately and thereafter the terminal bus bars 51 and 52 are inserted in the through holes 14 and 15, leakage of the sealing resin 21 through the first through hole 14 and the second through hole 15 can be reduced.

Figure 4:
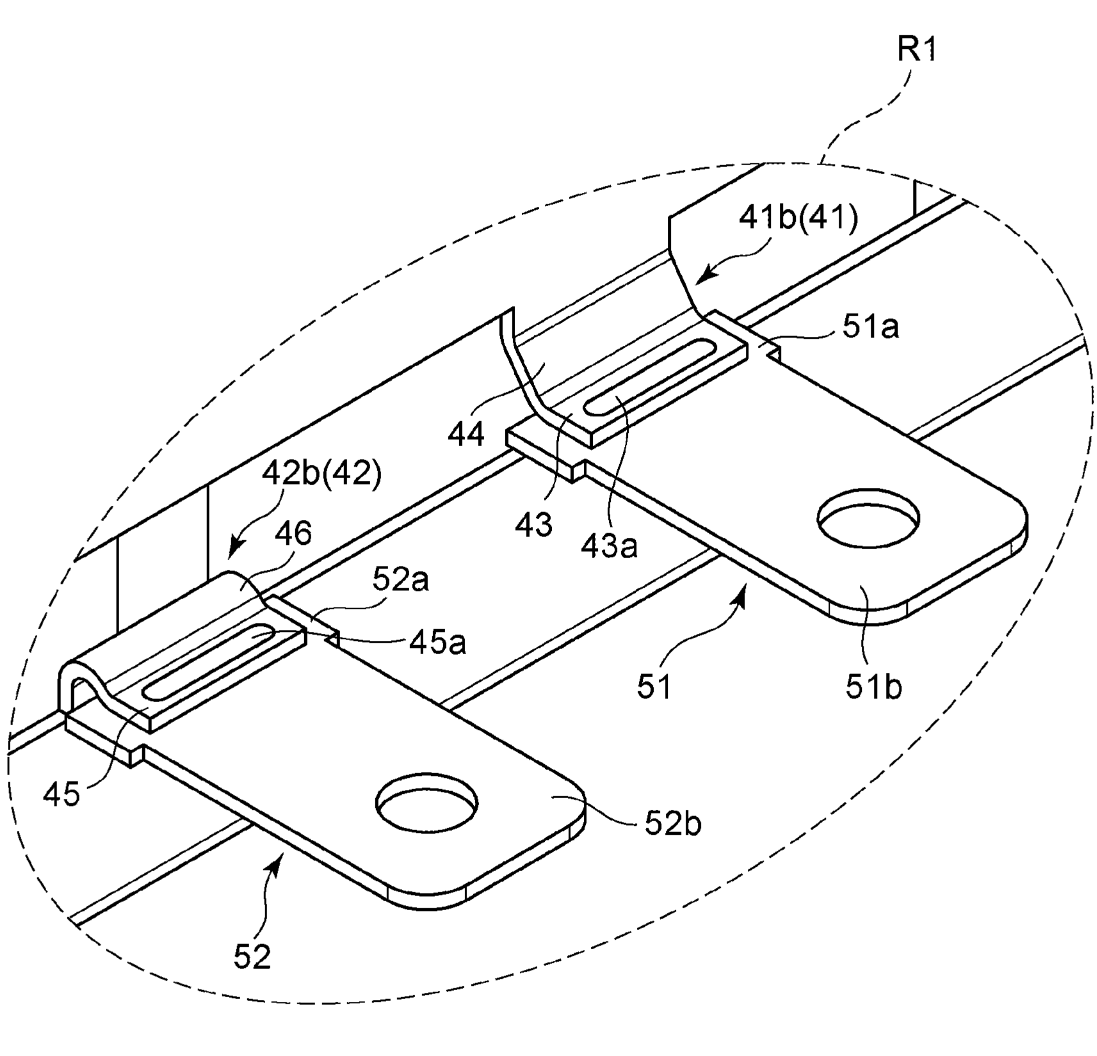
FIG. 4 is an enlarged view of region R1 of the capacitor module in FIG. 1.
Figure 4:
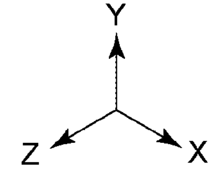
Figure 5A:
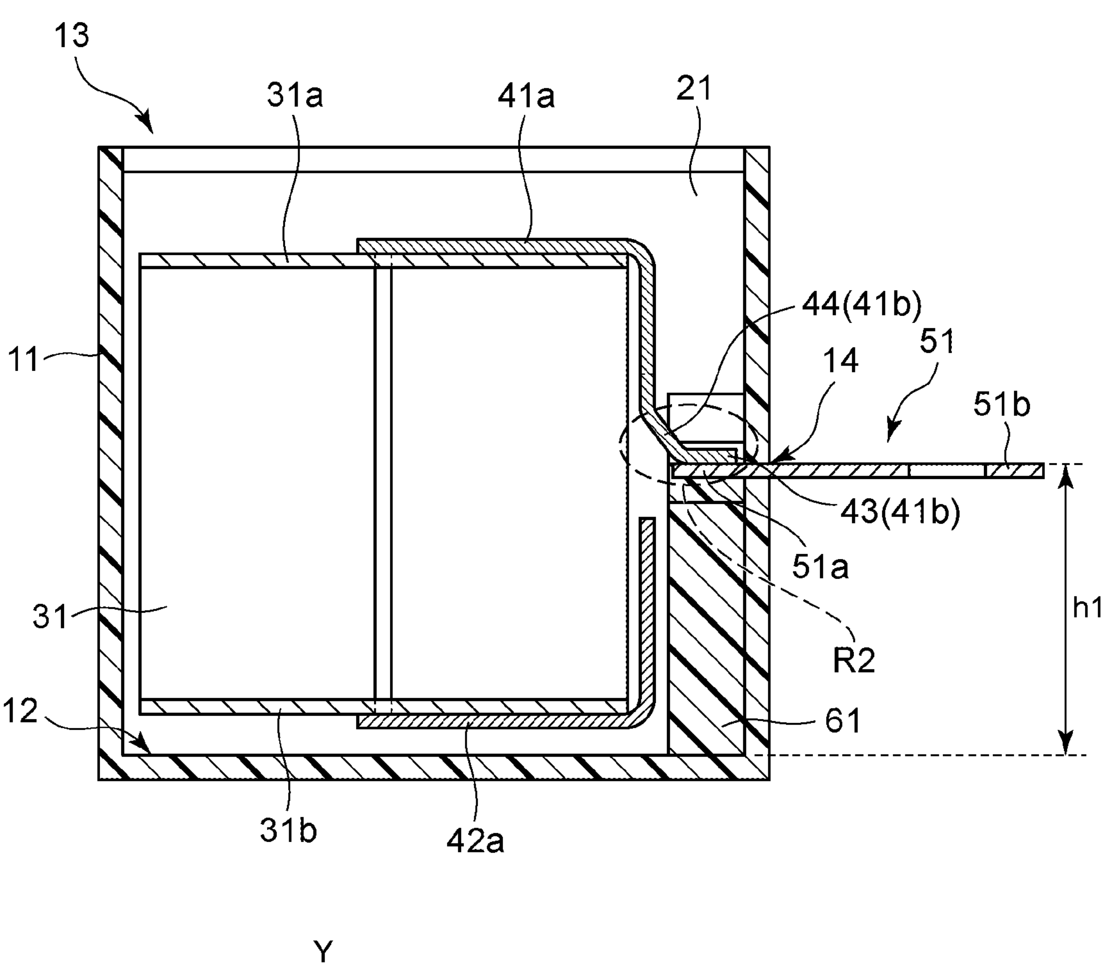
FIG. 5A is a cross-sectional view of the capacitor module in FIG. 1 taken along line A-A.
Figure 5B:
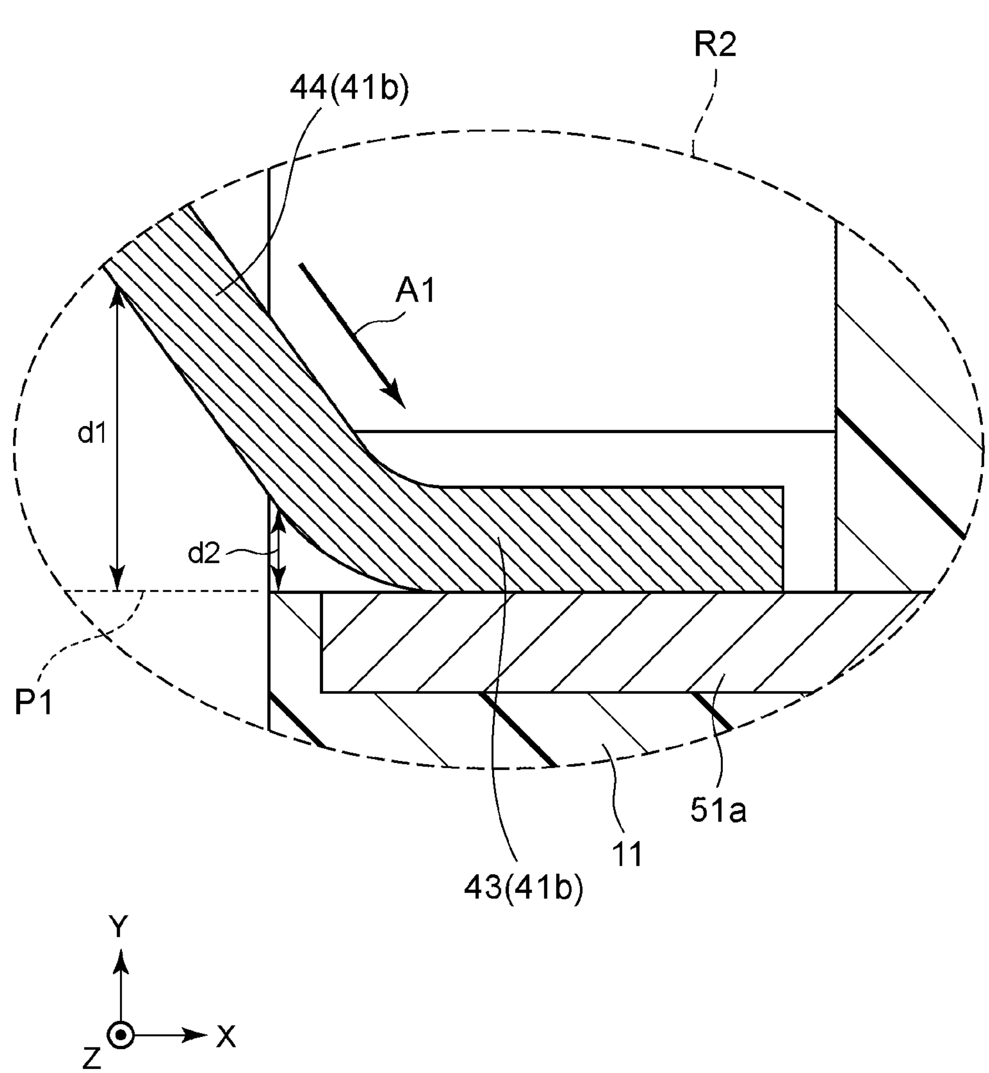
FIG. 5B is an enlarged view of region R2 in FIG. 5A.
Figure 6A:
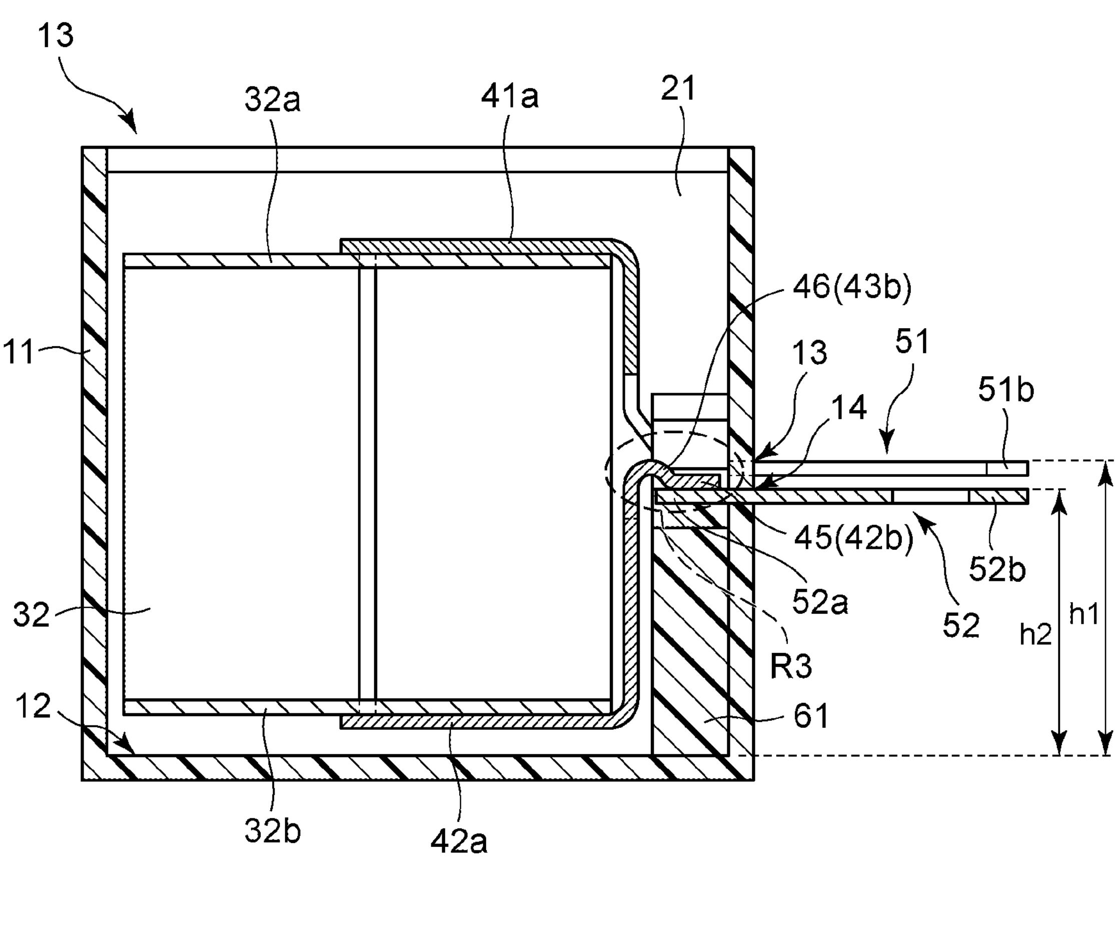
FIG. 6A is a cross-sectional view of the capacitor module in FIG. 1 taken along line B-B.
Figure 6B:
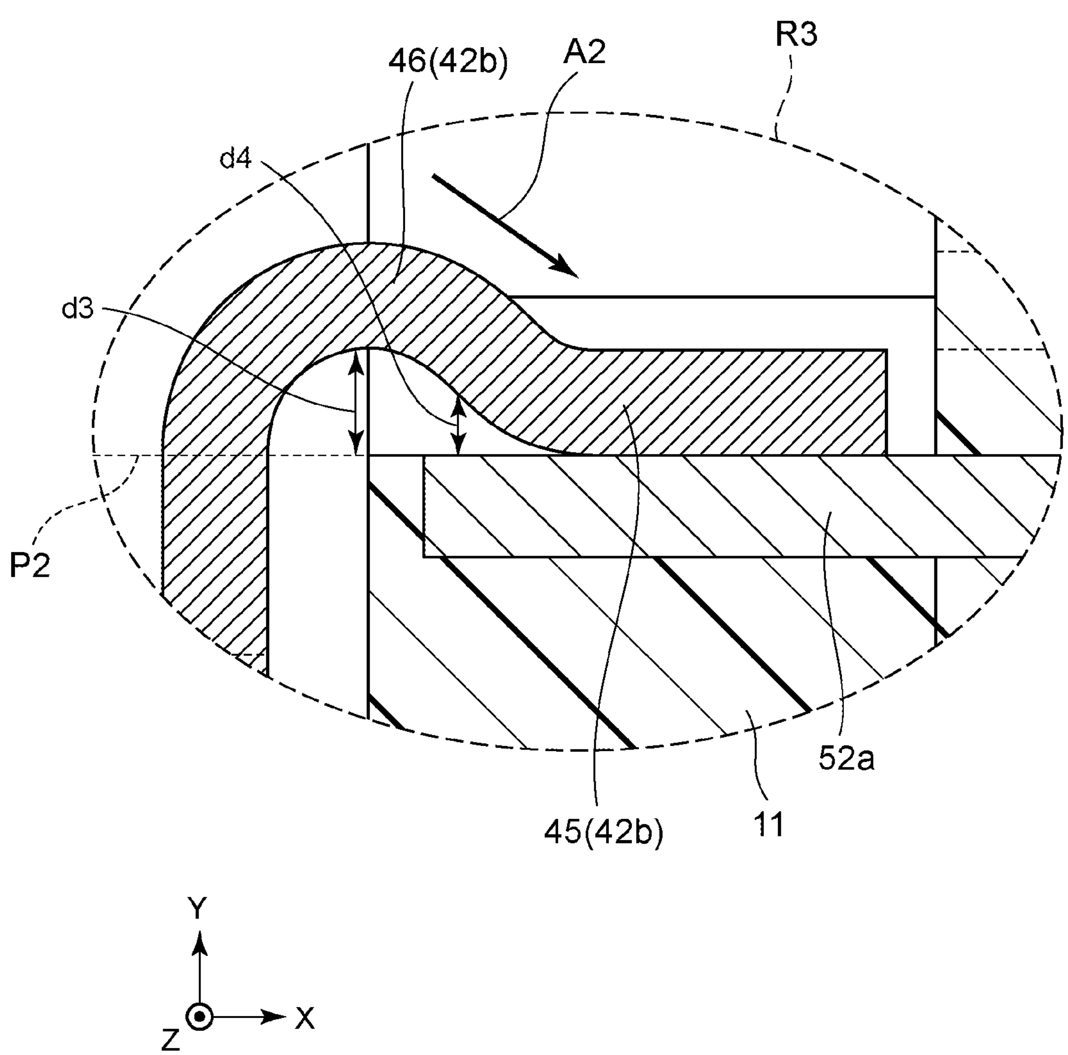
FIG. 6B is an enlarged view of region R3 in FIG. 6A.

Next, the connectors 41_b_ and 42_b_ of the capacitor connection bus bars 41 and 42 will be described with reference to FIGS. 4 to 6B. FIG. 4 is an enlarged view of region R1 of the capacitor module 100 in FIG. 1. FIG. 5A is a cross-sectional view of the capacitor module 100 in FIG. 1 taken along line A-A, and FIG. 5B is an enlarged view of region R2 in FIG. 5A. FIG. 6A is a cross-sectional view of the capacitor module 100 in FIG. 1 taken along line B-B. FIG. 6B is an enlarged view of region R3 in FIG. 6A. In FIG. 4, the case 11 and the sealing resin 21 are omitted.

As illustrated in FIGS. 5A and 5B, at least a part of the connector 41_b_ of the first capacitor connection bus bar 41 is inclined from the opening 13 toward the bottom surface 12 of the case 11, that is, inclined along the direction indicated by arrow A1 in FIG. 5B, and is connected to the first end 51_a_ of the first terminal bus bar 51. More specifically, as illustrated in FIG. 4, the connector 41_b_ of the first capacitor connection bus bar 41 includes a contact part 43 that makes surface contact with the first end 51_a_ of the first terminal bus bar 51, and an extending part 44 that extends from the contact part 43 in a direction away from the first terminal bus bar 51. In the present embodiment, the extending part 44 is inclined from the opening 13 toward the bottom surface 12 of the case 11.

As illustrated in FIGS. 5A and 5B, the contact part 43 is in surface contact with the first end 51_a_ of the first terminal bus bar 51, and the first capacitor connection bus bar 41 and the first terminal bus bar 51 are electrically connected to each other. In the present embodiment, the contact part 43 and the first end 51_a_ are welded by laser to form a welded portion 43_a_. Thus, further reliable electrical connection between the first capacitor connection bus bar 41 and the first terminal bus bar 51 can be established. The welded portion 43_a_ is formed at least in a part of the contact part 43. By joining the contact part 43 and the first end 51_a_ in this manner, the first capacitor connection bus bar 41 and the first terminal bus bar 51 can be joined by only emitting a laser to the contact part 43 and the first end 51_a_ in contact with each other. Using laser welding, a space for joining can be reduced, which contributes to downsizing of the capacitor module 100.

The extending part 44 is formed to extend from the contact part 43 in a direction away from the first end 51_a_ of the first terminal bus bar 51. As illustrated in FIG. 5B, the extending part 44 has a shape such that the distance from plane P1 on which the contact part 43 extends is larger with increasing distance from the first terminal bus bar 51. That is, in a part of the extending part 44 from a place where the extending part 44 is connected to the contact part 43 to a place closest to the opening 13, distance d1 from the plane P1 at any place of the extending part 44 is larger than distance d2 from the plane P1 at a place closer to the first terminal bus bar 51.

As illustrated in FIGS. 6A and 6B, at least a part of the connector 42_b_ of the second capacitor connection bus bar 42 is inclined from the opening 13 toward the bottom surface 12 of the case 11, that is, inclined along the direction indicated by arrow A2 in FIG. 6B, and is connected to the first end 52_a_ of the second terminal bus bar 52. More specifically, as illustrated in FIG. 4, the connector 42_b_ of the second capacitor connection bus bar 42 includes a contact part 45 that makes surface contact with the first end 52_a_ of the second terminal bus bar 52, and an extending part 46 that extends from the contact part 45 in a direction away from the second terminal bus bar 52. In the present embodiment, the extending part 46 is inclined from the opening 13 toward the bottom surface 12 of the case 11.

As illustrated in FIGS. 6A and 6B, the contact part 45 is in surface contact with the first end 52_a_ of the second terminal bus bar 52, and the second capacitor connection bus bar 42 and the second terminal bus bar 52 are electrically connected to each other. In the present embodiment, the contact part 45 and the first end 52*a* are welded by laser to form a welded portion 45*a*. Thus, further reliable electrical connection between the second capacitor connection bus bar 42 and the second terminal bus bar 52 can be established. The welded portion 45*a* is formed at least in a part of the contact part 45. By joining the contact part 45 and the first end 52*a* in this manner, the second capacitor connection bus bar 42 and the second terminal bus bar 52 can be joined by only emitting a laser to the contact part 45 and the first end 52*a* in contact with each other. Using laser welding, a space for joining can be reduced, which contributes to downsizing of the capacitor module 100.

The extending part 46 is formed to extend from the contact part 45 in a direction away from the first end 52*a* of the second terminal bus bar 52. As illustrated in FIG. 6B, the extending part 46 has a shape such that the distance from plane P2 on which the contact part 45 extends is larger with increasing distance from the second terminal bus bar 52. That is, in a part of the extending part 46 from a place where the extending part 46 is connected to the contact part 45 to a place closest to the opening 13, distance d3 from the plane P2 at any place of the extending part 46 is larger than distance d4 from the plane P2 at a place closer to the second terminal bus bar 52.

In the present embodiment, as illustrated in FIG. 6A, height h1 from a bottom surface 12 of the case 11 to the first terminal bus bar 51 is different from height h2 from the bottom surface 12 of the case 11 to the second terminal bus bar 52. More specifically, the height h1 (see FIG. 5A) at which the contact part 43 of the first capacitor connection bus bar 41 is connected to the first end 51*a* is set higher than the height h2 at which the contact part 45 of the second capacitor connection bus bar 42 is connected to the first end 52*a*. By arranging the first terminal bus bar 51 and the second terminal bus bar 52 in this manner, when the first and second terminal bus bars 51 and 52 are provided side by side as illustrated in FIG. 4, interference between the first capacitor connection bus bar 41 connected to the first terminal bus bar 51 and the second capacitor connection bus bar 42 connected to the second terminal bus bar 52 can be suppressed.

Figure 7A:
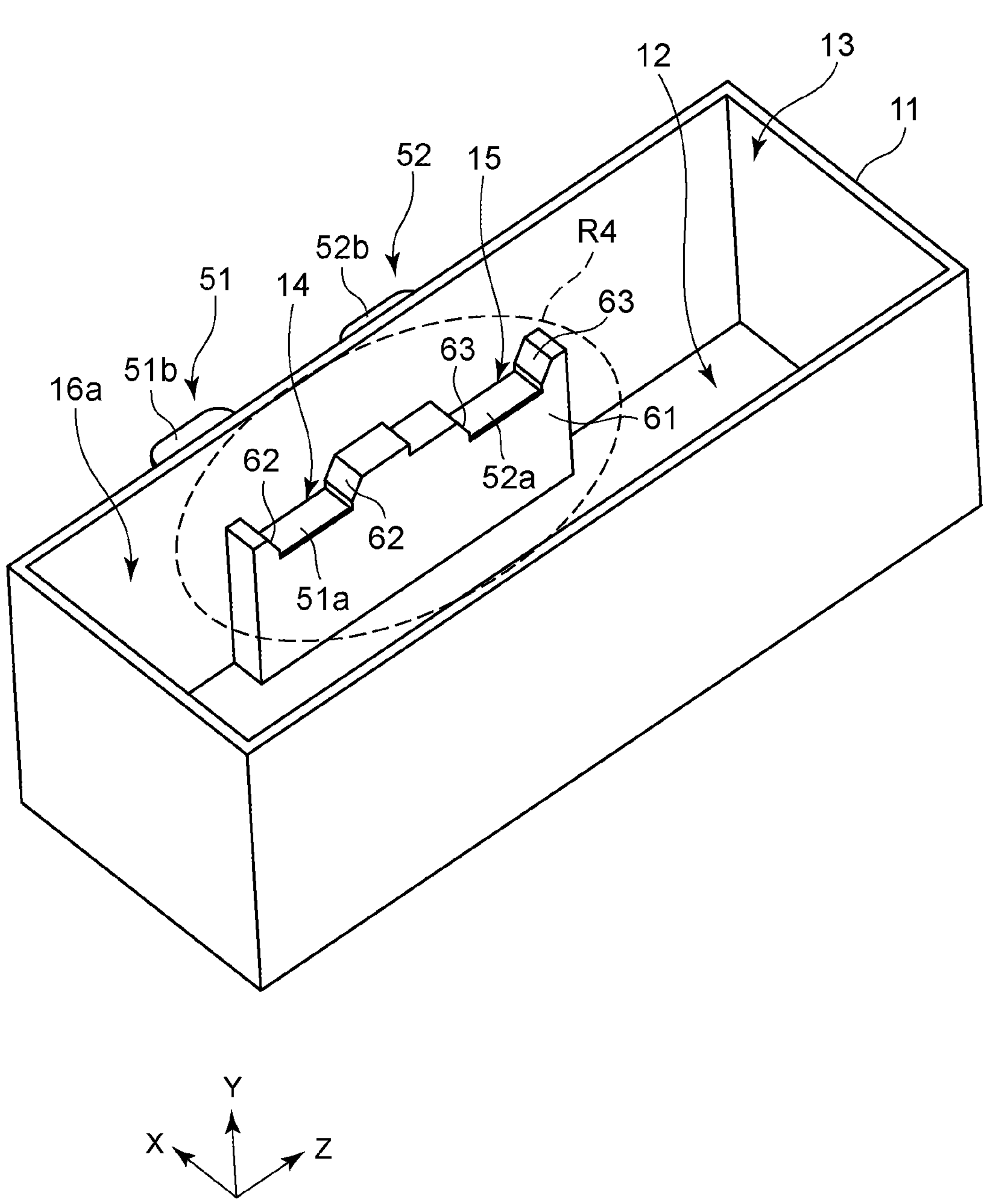
FIG. 7A is a view illustrating a structure inside the case of the capacitor module in FIG. 1.
Figure 7B:
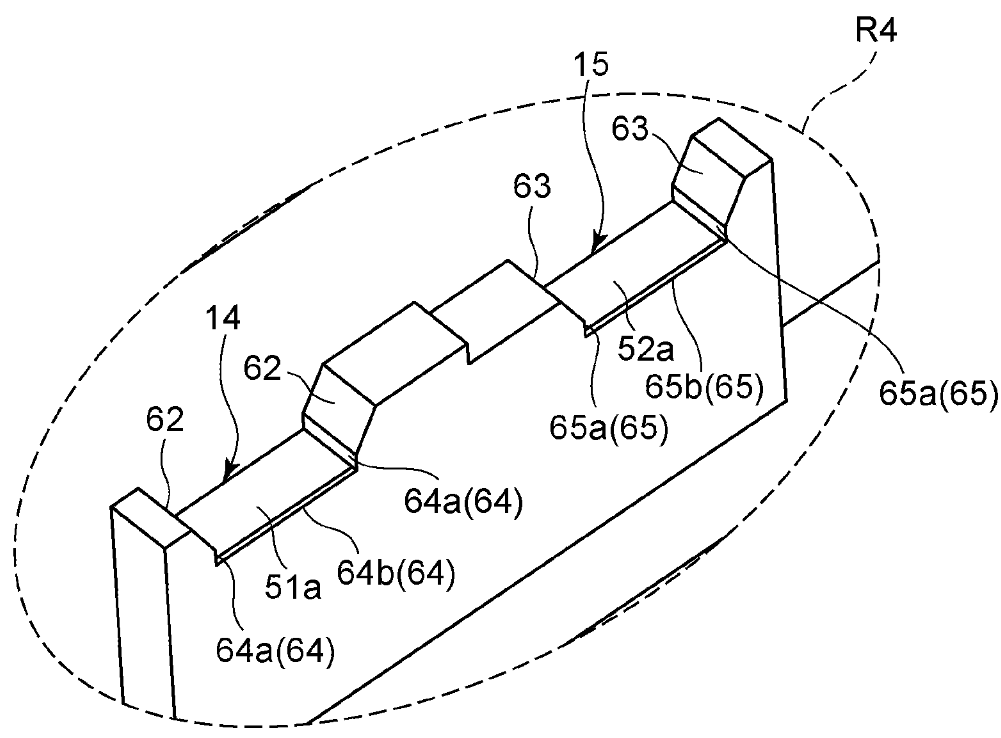
FIG. 7B is an enlarged view of region R4 in FIG. 7A.
Figure 7B:
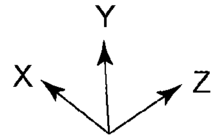

FIG. 7A is a view illustrating a structure inside the case 11 of the capacitor module 100 in FIG. 1. FIG. 7B is an enlarged view of region R4 in FIG. 7A. In the present embodiment as illustrated in FIGS. 7A and 7B, the case 11 includes a base 61 for disposing and supporting the terminal bus bars 51 and 52. The base 61 is provided to have a shape partially protruding from an inner side surface 16*a* of the case 11 on a side closer to the bottom surface 12 than the first through hole 14 and on a side closer to the bottom surface 12 than the second through hole 15. The first ends 51*a* and 52*a* of the terminal bus bars 51 and 52 are disposed on the base 61 and supported by the base 61.

The base 61 has slopes 62 and 63. Each of the slopes 62 and 63 is an inclined surface inclined with respect to the Y direction. A pair of slopes 62 are provided with a gap therebetween in the Z direction, and a pair of slopes 63 are provided with a gap therebetween in the Z direction. The slopes 62 are disposed so as to sandwich the first through hole 14 in the Z direction, and are each inclined toward the through hole 14. The slopes 63 are disposed so as to sandwich the second through hole 15 in the Z direction, and are each inclined toward the through hole 15.

As illustrated in FIG. 7B, a support 64 is provided between the slopes 62. The support 64 is for supporting the first end 51*a*, and has a pair of side surfaces 64*a* extending in the Y direction and a bottom surface 64*b*. As illustrated in FIG. 7B, a support 65 is provided between the slopes 63. The support 65 is for supporting the first end 52*a*, and has a pair of side surfaces 65*a* extending in the Y direction and a bottom surface 65*b*.

The slopes 62 has a function of guiding the connector 41*b* toward the support 64 when the first capacitor connection bus bar 41 connected to the first electrodes of the capacitors 31 and 32 is inserted from the opening 13 of the case 11. The support 64 has a function of restricting the movement in the Z direction of the connector 41*b* guided by the slopes 62 to be disposed on the support 64, thereby positioning the connector 41*b*.

Similarly, the slopes 63 have a function of guiding the connector 42*b* toward the support 65 when the second capacitor connection bus bar 42 connected to the second electrodes of the capacitors 31 and 32 is inserted from the opening 13 of the case 11. The support 65 has a function of restricting the movement in the Z direction of the connector 42*b* guided by the slopes 63 to be disposed on the support 64, thereby positioning the connector 42*b*.

[Manufacturing Method]

Figure 8:
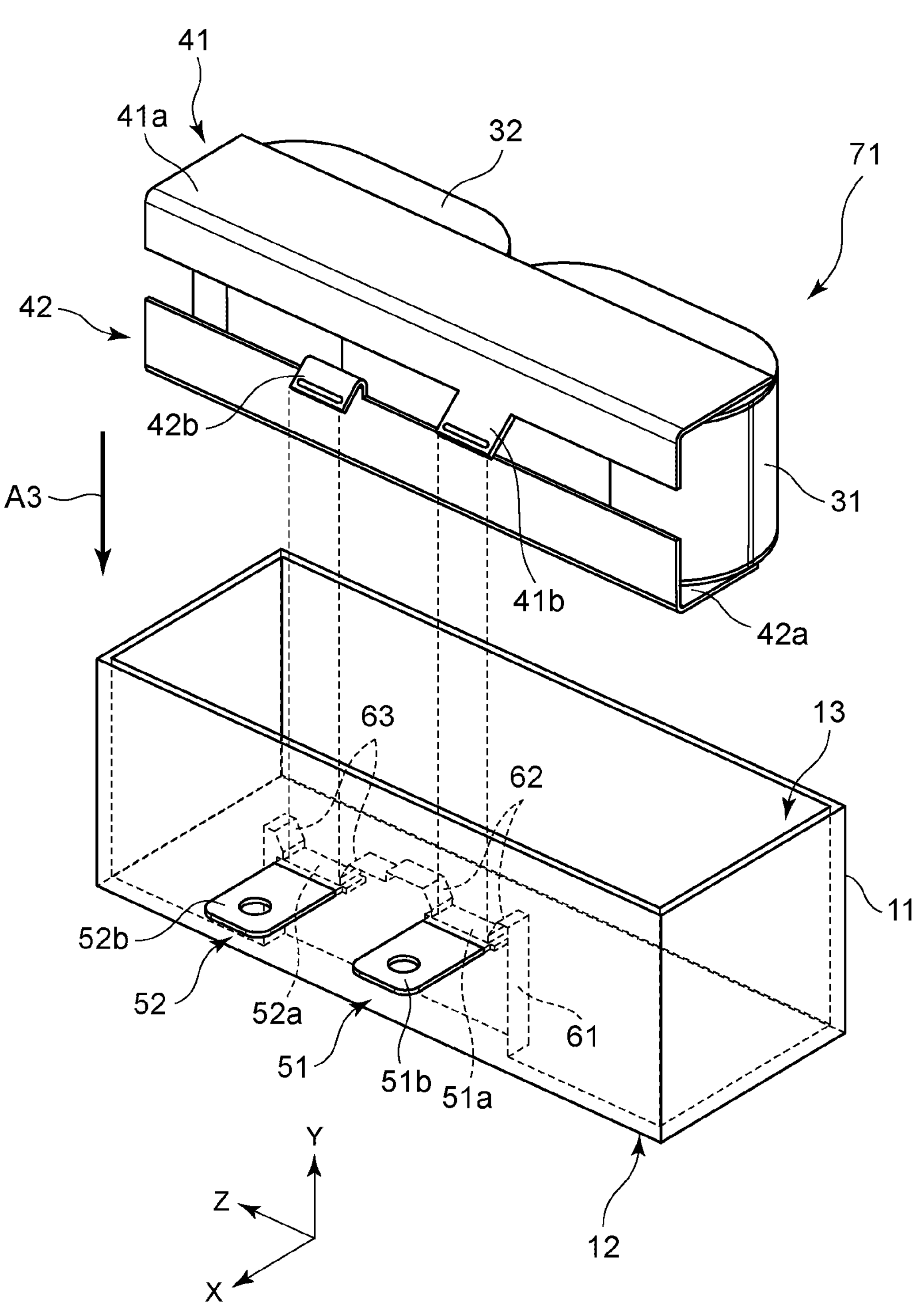
FIG. 8 is a view illustrating a part of a manufacturing process of the capacitor module in FIG. 1.

FIG. 8 is a view illustrating a part of a manufacturing process of the capacitor module 100 in FIG. 1. A method for manufacturing the capacitor module 100 will be described with reference to FIG. 8. In FIG. 8, the case 11 is drawn transparent for explanation. In FIG. 8, the sealing resin 21 is omitted.

First, the assembly 71 is prepared in which the first capacitor connection bus bar 41 is connected to the first electrodes 31*a* and 32*a* of the capacitors 31 and 32 and the second capacitor connection bus bar 42 is connected to the second electrodes 31*b* and 32*b* of the capacitors 31 and 32. The capacitors 31 and 32 can be connected to the first capacitor connection bus bar 41 and the second capacitor connection bus bar 42 by, for example, soldering.

Next, the case 11 and the terminal bus bars 51 and 52 are formed. The case 11 is formed integrally with the first terminal bus bar 51 and the second terminal bus bar 52 by, for example, insert molding.

Next, the assembly 71 is inserted in the case 11. Specifically, the assembly 71 is inserted in an insertion direction (direction indicated by arrow A3 in FIG. 8) from the opening 13 toward the bottom surface 12 of the case 11 with the second capacitor connection bus bar 42 of the assembly 71 facing the case 11. When the assembly 71 is inserted in the case 11, the connectors 41*b* and 42*b* contact the first ends 51*a* and 52*a* of the terminal bus bars 51 and 52.

As illustrated in FIG. 8, the first ends 51*a* and 52*a* of the terminal bus bars 51 and 52 are surfaces parallel to an XZ plane, whereas the connectors 41*b* and 42*b* of the capacitor connection bus bars 41 and 42 are inclined toward the bottom surface side of the case 11. With this configuration, contacts between the connectors 41*b* and 42*b* and the first ends 51*a* and 52*a* start at the distal end sides of the connectors 41*b* and 42*b*, and the distal end sides of the connectors 41*b* and 42*b* are pressed against the first ends 51*a* and 52*a* to form the contact parts 43 and 45 that make surface contact with the first ends 51*a* and 52*a*. Accordingly, the connectors 41*b* and 42*b* can be reliably brought into contact with the first ends 51*a* and 52*a*.

During insertion of the assembly 71 in the case 11, the connectors 41*b* and 42*b* are guided toward the supports 64 and 65 along the slopes 62 and 63 of the base 61 of the case 11. The connectors 41*b* and 42*b* disposed on the supports 64 and 65 contact the first ends 51*a* and 52*a* and are positioned in the Z direction. This prevents positional displacement of the assembly 71 inserted in the case 11. In this manner, by inserting the connectors 41*b* and 42*b* toward the bottom surface side, the connectors 41*b* and 42*b* can be accurately brought into contact with the first ends 51*a* and 52*a*, which enables easy assembling of the capacitor module 100.

After the assembly 71 is inserted in the case 11, the connectors 41*b* and 42*b* are connected to the first ends 51*a* and 52*a* by welding. More specifically, the contact parts 43 and 45, of the connectors 41*b* and 42*b*, in surface contact with the first ends 51*a* and 52*a* are irradiated with a laser, an electron beam, or the like from above (+Y direction). As a result, some regions of the contact parts 43 and 45 are integrally joined to the first ends 51*a* and 52*a* located below the contact parts 43 and 45 to form the welded portions 43*a* and 45*a* (see FIG. 4). Accordingly, connection between the capacitor connection bus bars 41 and 42 and the terminal bus bars 51 and 52 can be easily and accurately formed.

Then, the case 11 is filled with the sealing resin 21 to complete the capacitor module 100.

Effects

The capacitor module 100 according to the first embodiment can manifest the following effects.

The capacitor module 100 includes the case 11, the sealing resin 21, the capacitors 31 and 32, the capacitor connection bus bars 41 and 42, and the terminal bus bars 51 and 52. In the case 11, the opening 13 is formed at a location facing the bottom surface 12, and the through holes 14 and 15 are formed in the side surface. The sealing resin 21 is filled in the case 11. The capacitors 31 and 32 are housed in the case 11. The capacitor connection bus bars 41 and 42 are connected to the electrodes of the capacitors 31 and 32. The terminal bus bars 51 and 52 are positioned by the through holes 14 and 15, the first ends 51*a* and 52*a* are located inside the case 11, and the second ends 51*b* and 52*b* are located outside the case 11. The terminal bus bars 51 and 52 connect the first ends 51*a* and 52*a* to the capacitor connection bus bars 41 and 42. The capacitor connection bus bar 41 has a connector at least a part of which is inclined from the opening 13 toward the bottom surface 12 of the case 11 and is connected to the first ends 51*a* and 52*a* of the terminal bus bars 51 and 52.

With this configuration, the capacitor module 100 that can be easily assembled can be provided. Since at least a part of the connectors 41*b* and 42*b* is inclined from the opening 13 toward the bottom surface 12 of the case 11, the connectors 41*b* and 42*b* can be reliably connected to the first ends 51*a* and 52*a*.

The connectors 41*b* and 42*b* include the contact parts 43 and 45 that make surface contact with the first ends 51*a* and 52*a* and the extending parts 44 and 46 extending from the contact parts 43 and 45 in a direction away from the terminal bus bars 51 and 52.

The extending parts 44 and 46 each have a shape such that the distance from the plate-shaped plane P1 or P2 on which the contact parts 43 or 45 extends is larger with increasing distance from the terminal bus bar 51 or 52.

With such a configuration, by inserting the assembly 71, in which the capacitors 31 and 32 are connected to the capacitor connection bus bars 41 and 42, in the case 11, the connectors 41*b* and 42*b* are pressed against the first ends 51*a* and 52*a*. Accordingly, the connectors 41*b* and 42*b* can be more reliably brought into contact with the first ends 51*a* and 52*a*.

The connectors 41*b* and 42*b* are connected to the first ends 51*a* and 52*a* of the terminal bus bars 51 and 52 by welding. With such a configuration, electrical connections between the connectors 41*b* and 42*b* and the first ends 51*a* and 52*a* can be further ensured.

The case 11 includes the base 61 formed closer to the bottom surface 12 than the through holes 14 and 15 and on which the first ends 51*a* and 52*a* of the terminal bus bars 51 and 52 are disposed.

The base 61 is disposed so as to sandwich the through holes 14 and 15, and has the slopes 62 and 63 inclined toward the through holes 14 and 15. The slopes 62 and 63 restrict the movement of the connectors 41*b* and 42*b* in a direction along the bottom surface 12.

With such a configuration, positioning of the connectors 41*b* and 42*b* can be made, whereby positional error of the connectors 41*b* and 42*b* can be prevented and the connectors 41*b* and 42*b* can be more reliably connected to the first ends 51*a* and 52*a*.

Note that, in the embodiment described above, an example has been described in which the capacitor module 100 includes two capacitors 31 and 32, but the number of capacitors is not limited to two, and may be one or more. In addition, the disposition of the capacitors 31 and 32 in the case 11 is not limited to the example described above.

In addition, in the embodiment described above, an example has been described in which the capacitor module 100 includes the two capacitor connection bus bars 41 and 42 and the terminal bus bars 51 and 52, but the present invention is not limited to such a configuration. For example, the bus bar connected to one electrode of the capacitor may be a capacitor connection bus bar connected to the terminal bus bar, and the bus bar connected to the other electrode may be connected to the outside through the opening 13 of the case 11.

Second Embodiment

A capacitor module 200 according to a second embodiment of the present invention will be described.

Mainly described for the second embodiment is the point different from the first embodiment. In the second embodiment, the same or equivalent configuration as that of the first embodiment will be described with the same reference numerals. In the second embodiment, the same description as that of the first embodiment is omitted.

Figure 9:
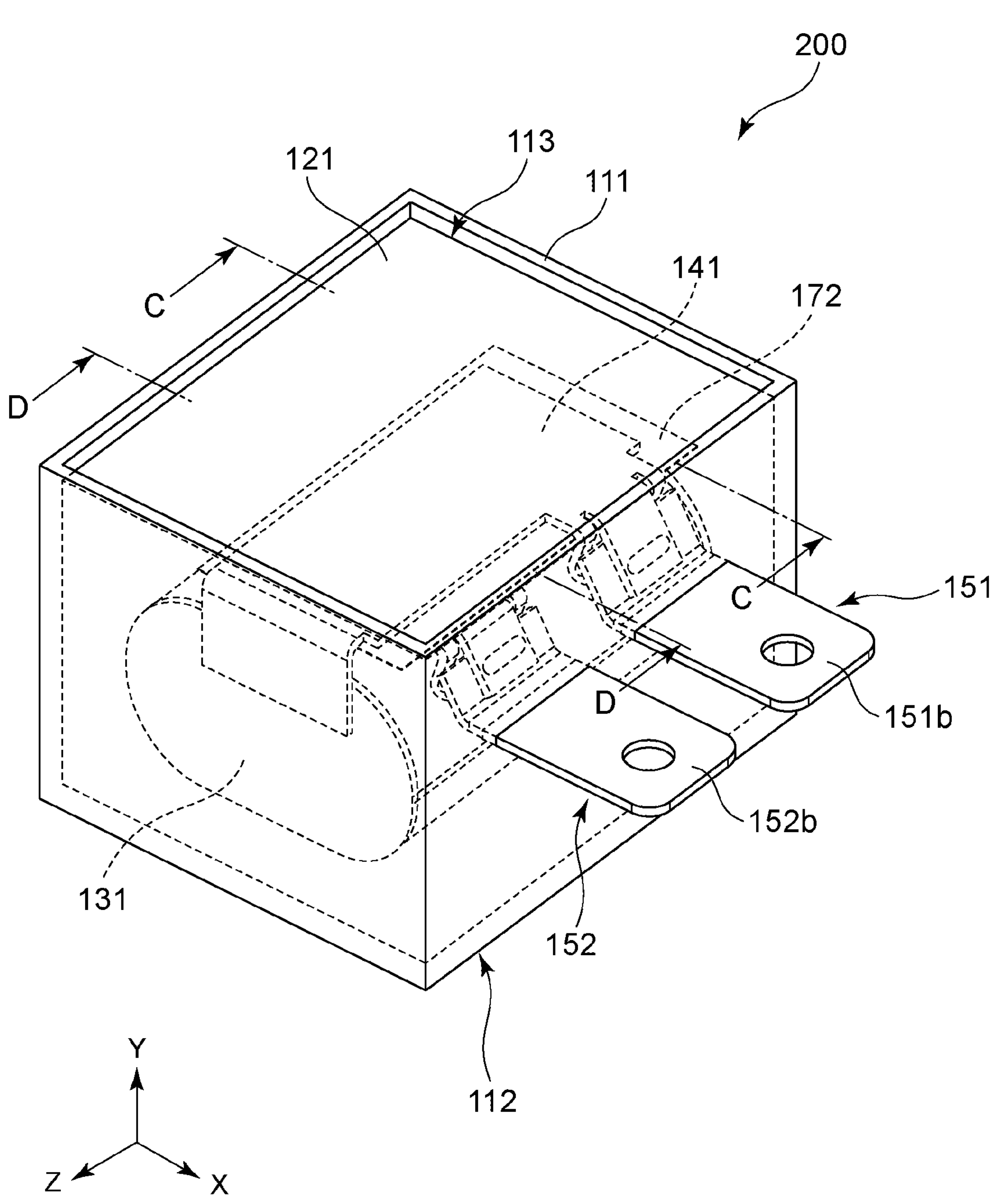
FIG. 9 is a perspective view of a capacitor module according to a second embodiment.
Figure 10:
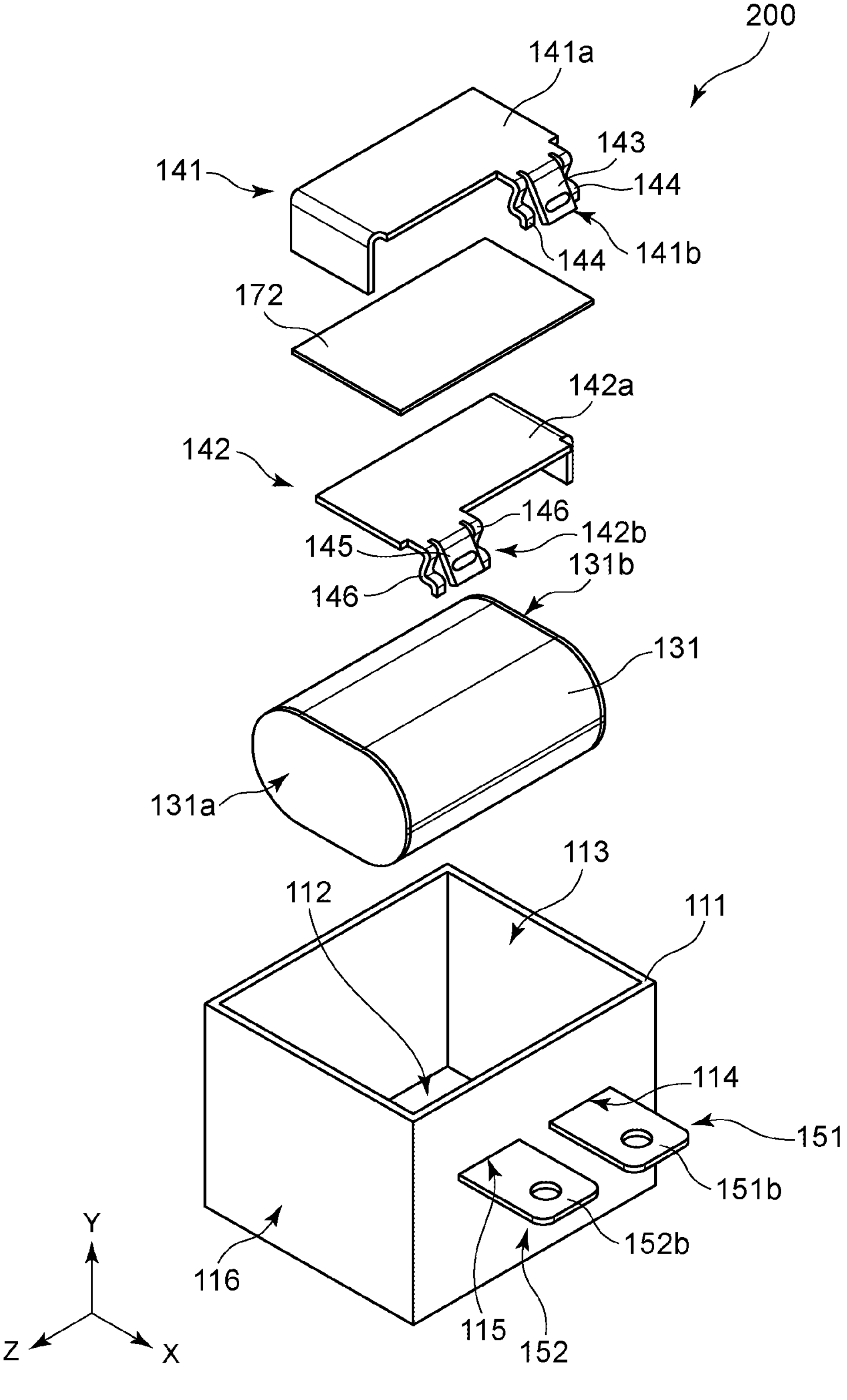
FIG. 10 is an exploded perspective view of the capacitor module in FIG. 9.
Figure 11:
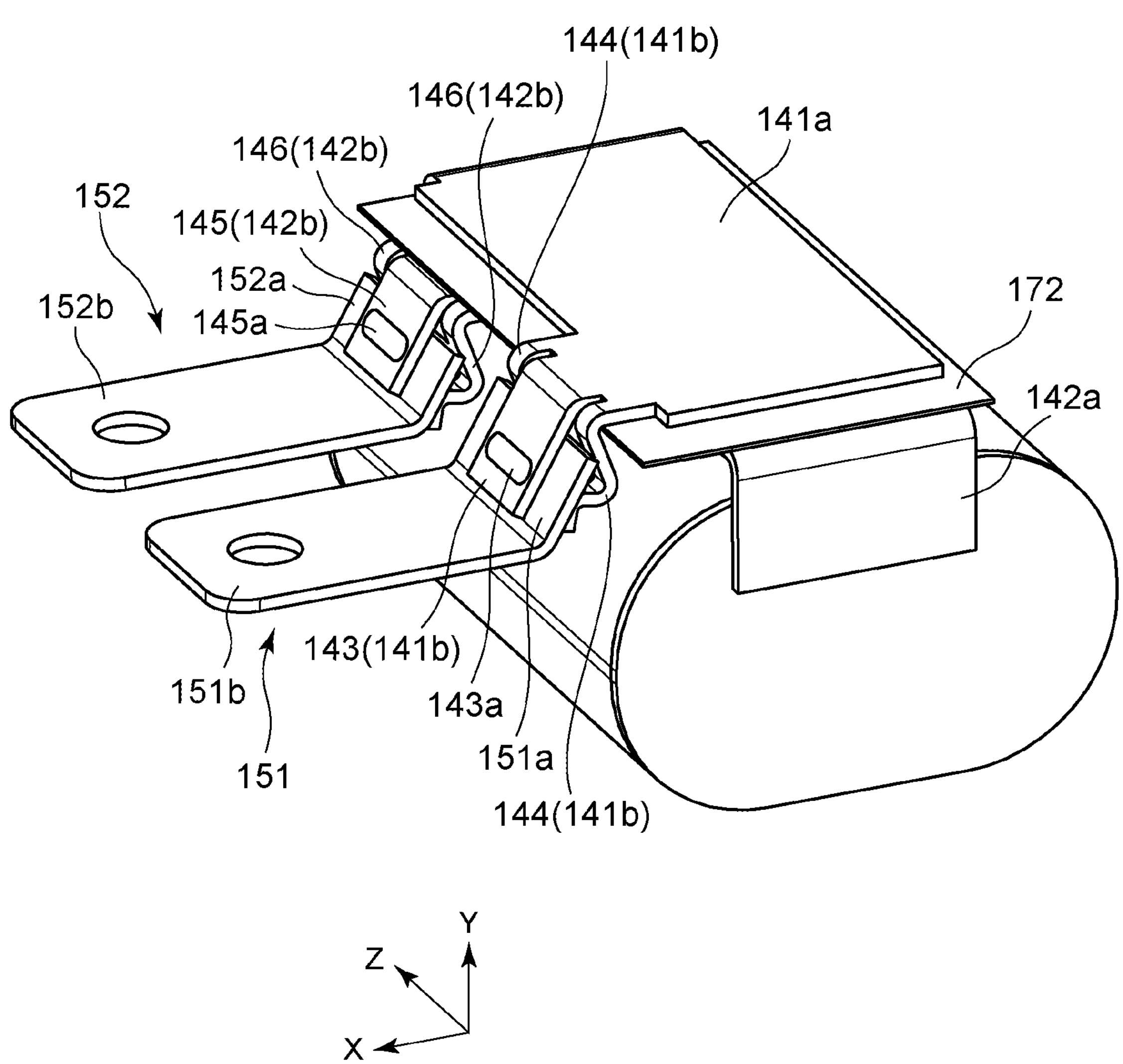
FIG. 11 is a view for explaining connection between a capacitor connection bus bar and a terminal bus bar of the capacitor module in FIG. 9.

FIG. 9 is a perspective view of a capacitor module 200 according to the second embodiment. FIG. 10 is an exploded perspective view of the capacitor module 200 in FIG. 9. FIG. 11 is a view for explaining connection between capacitor connection bus bars 141 and 142 and terminal bus bars 151 and 152 of the capacitor module 200 in FIG. 9. In FIG. 10, sealing resin 21 is omitted, and in FIG. 11, the sealing resin 21 and a case 111 are omitted.

As illustrated in FIGS. 9 to 11, the second embodiment is different from the first embodiment in shapes of connectors 141*b* and 142*b* of the capacitor connection bus bars 141 and 142 and shapes of first ends 151*a* and 152*a* of the terminal bus bars 151 and 152.

In the present embodiment, a main body 141*a* of the first capacitor connection bus bar 141 and a main body 142*a* of the second capacitor connection bus bar 142 are disposed to overlap each other. An insulating sheet 172 is disposed between the main body 141*a* of the first capacitor connection bus bar 141 and the main body 142*a* of the second capacitor connection bus bar 142.

As illustrated in FIGS. 9 to 11, the connector 141*b* of the first capacitor connection bus bar 141 includes a pressing part 143 and a spring part 144. As illustrated in FIG. 11, the connector 141*b* and the first end 151*a* are connected to each other by sandwiching the first end 151*a* of the first terminal bus bar 151 between the pressing part 143 and the spring part 144. The first terminal bus bar 151 is inserted in a first through hole 114 of the case 111, the first end 151*a* is disposed inside the case 111, and a second end 151*b* is disposed outside the case 111. The pressing part 143 and the first end 151*a* are welded by laser to form a welded portion 143*a*.

Similarly, as illustrated in FIGS. 9 to 11, the connector 142*b* of the second capacitor connection bus bar 142 includes a pressing part 145 and a spring part 146. As illustrated in FIG. 11, the connector 142*b* and the first end 152*a* are connected to each other by sandwiching the first end 152*a* of the second terminal bus bar 152 between the pressing part 145 and the spring part 146. The second terminal bus bar 152 is inserted in a second through hole 115 of the case 111, the first end 152*a* is disposed inside the case 111, and a second end 152*b* is disposed outside the case 111. The pressing part 145 and the first end 152*a* are welded by laser to form a welded portion 145*a*.

Figure 12:
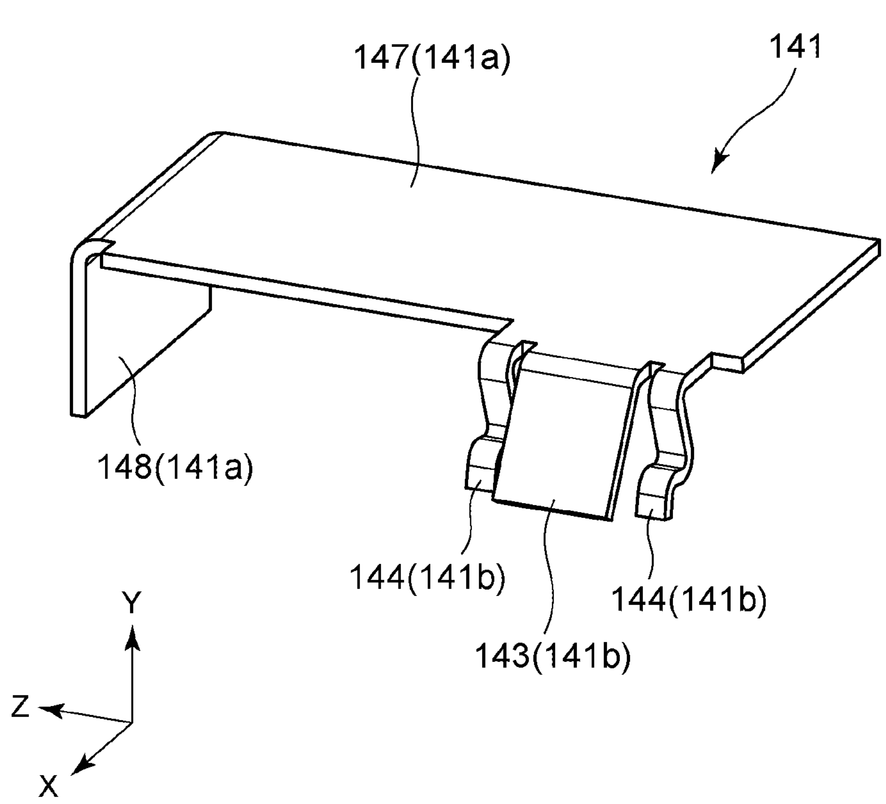
FIG. 12 is a perspective view illustrating a first capacitor connection bus bar of the capacitor module in FIG. 9.
Figure 13:
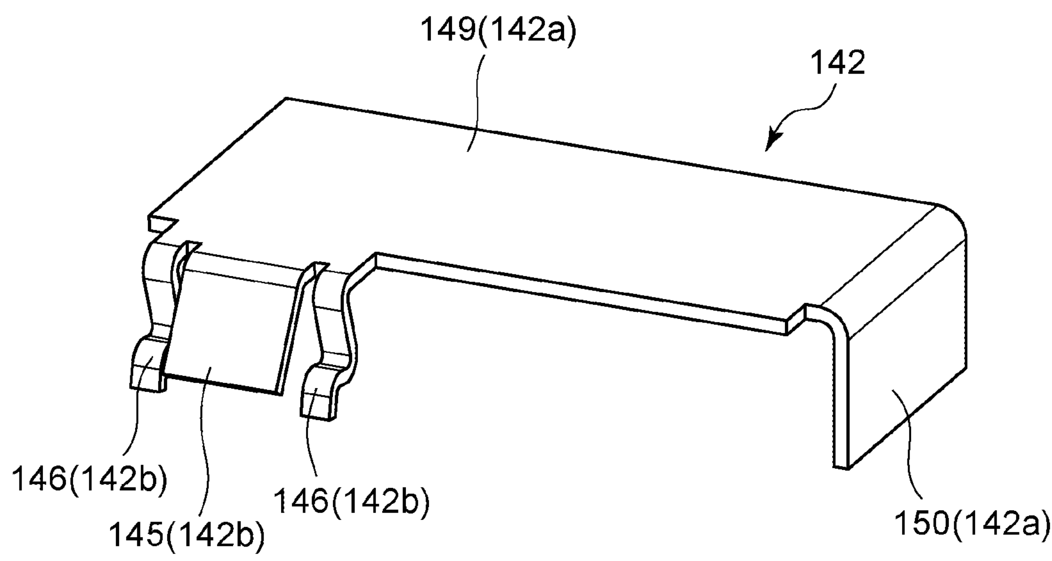
FIG. 13 is a perspective view illustrating a second capacitor connection bus bar of the capacitor module in FIG. 9.
Figure 13:
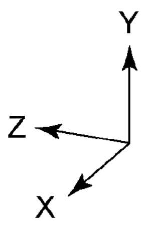

FIG. 12 is a perspective view illustrating the first capacitor connection bus bar 141 of the capacitor module 200 in FIG. 9. FIG. 13 is a perspective view illustrating the second capacitor connection bus bar 142 of the capacitor module 200 in FIG. 9. The first capacitor connection bus bar 141 and the second capacitor connection bus bar 142 of the present embodiment will be described with reference to FIGS. 12 and 13.

As illustrated in FIG. 12, the first capacitor connection bus bar 141 includes the main body 141*a* and the connector 141*b*. In the present embodiment, as illustrated in FIGS. 9 and 10, a capacitor 131 is disposed such that electrodes 131*a* and 131*b* face a side surface of the case 111. As illustrated in FIG. 12, the main body 141*a* of the first capacitor connection bus bar 141 includes a plate portion 147 and a bent portion 148 connected to the electrode 131*a*.

The connector 141*b* of the first capacitor connection bus bar 141 includes the pressing part 143 and the spring part 144. The pressing part 143 is formed in a plate shape. The spring part 144 is formed such that a plate-shaped member is bent to have a spring property. The spring parts 144 are disposed on both sides, in the Z direction, of the pressing part 143. The first end 151*a* of the first terminal bus bar 151 is sandwiched and held by the pressing part 143 and the spring parts 144.

As illustrated in FIG. 13, the second capacitor connection bus bar 142 includes the main body 142*a* and the connector 142*b*. In the present embodiment, as illustrated in FIGS. 9 and 10, a capacitor 131 is disposed such that the electrodes 131*a* and 131*b* face the side surface of the case 111. As illustrated in FIG. 13, the main body 142*a* of the second capacitor connection bus bar 142 includes a plate portion 149 and a bent portion 150 connected to the electrode 131*b*.

The connector 142*b* of the second capacitor connection bus bar 142 includes the pressing part 145 and the spring part 146. The pressing part 145 is formed in a plate shape. The spring part 146 is formed such that a plate-shaped member is bent to have a spring property. The spring parts 146 are disposed on both sides, in the Z direction, of the pressing part 145. The first end 152*a* of the second terminal bus bar 152 is sandwiched and held by the pressing part 145 and the spring parts 146.

Figure 14:
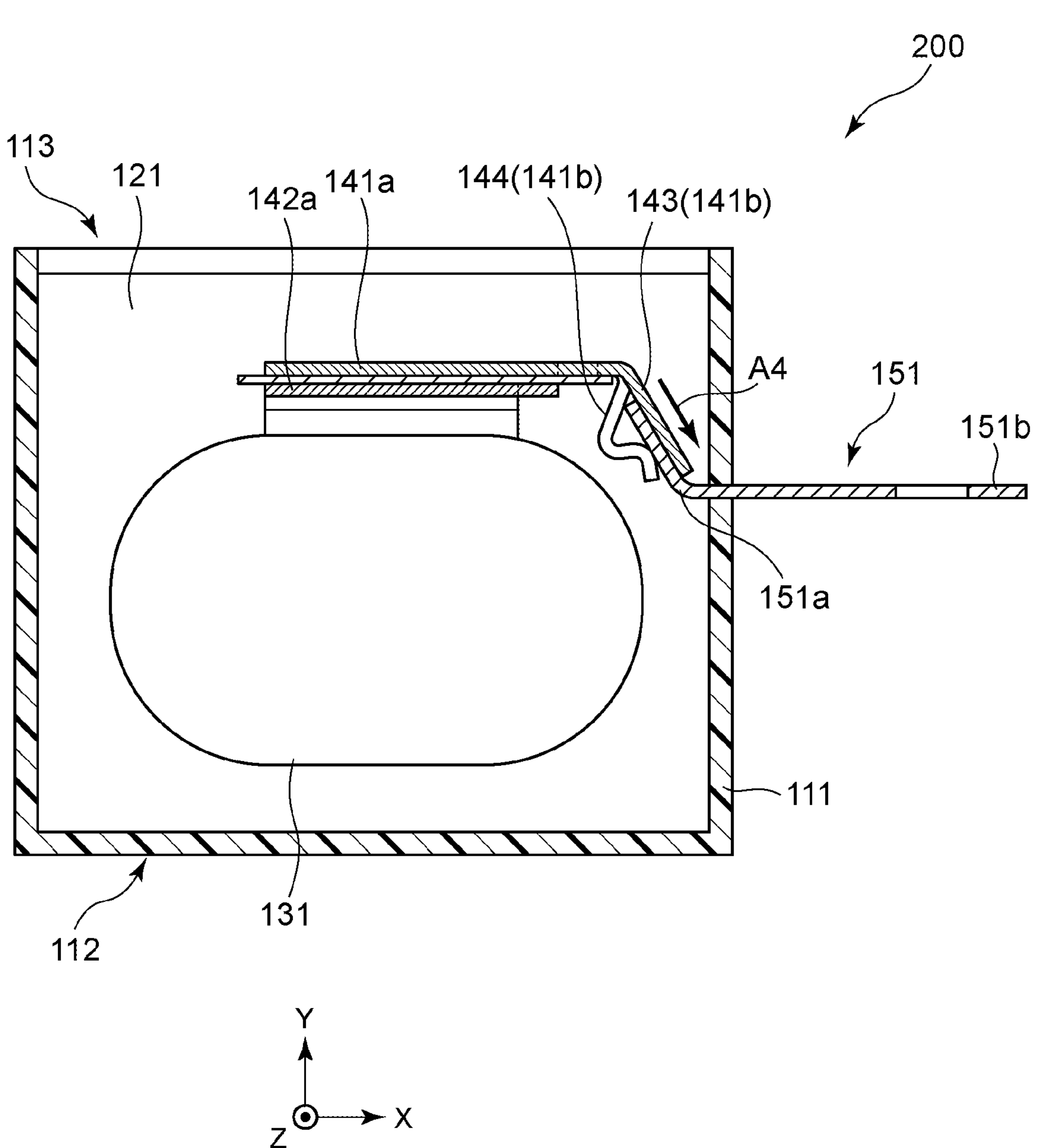
FIG. 14 is a cross-sectional view of the capacitor module in FIG. 9 taken along line C-C.
Figure 15:
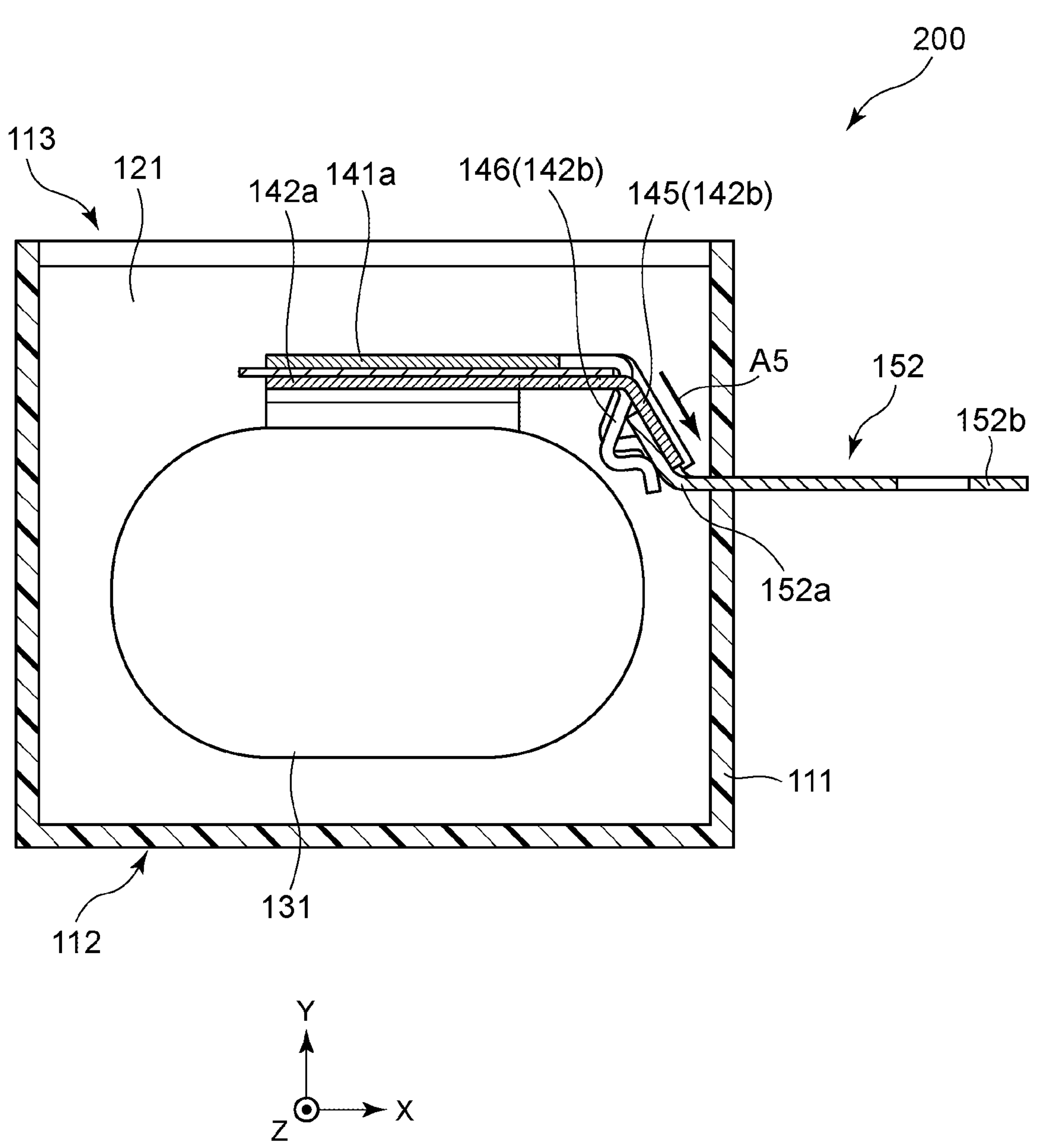
FIG. 15 is a cross-sectional view of the capacitor module in FIG. 9 taken along line D-D.

FIG. 14 is a cross-sectional view of the capacitor module 200 in FIG. 9 taken along line C-C. FIG. 15 is a cross-sectional view of the capacitor module 200 in FIG. 9 taken along line D-D.

As illustrated in FIG. 14, the connector 141*b* of the first capacitor connection bus bar 141 is inclined from the opening 113 toward the bottom surface 112 of the case 111, that is, inclined to extend along the direction indicated by arrow A4. The first end 151*a* of the first terminal bus bar 151 is inclined to extend from the bottom surface 112 toward the opening 113 of the case 111.

As illustrated in FIG. 15, the connector 142*b* of the second capacitor connection bus bar 142 is inclined from the opening 113 toward the bottom surface 112 of the case 111, that is, inclined to extend along the direction indicated by arrow A5. The first end 152*a* of the second terminal bus bar 152 is inclined to extend from the bottom surface 112 toward the opening 113 of the case 111.

With such a configuration, by inserting the assembly, in which the capacitor 131 is connected to the capacitor connection bus bars 141 and 142 in the case 111, from the opening 113, the connectors 141*b* and 142*b* and the first ends 151*a* and 152*a* can be positioned easily. Since the first ends 151*a* and 152*a* are sandwiched by the pressing parts 143 and 145 and the spring parts 144 and 146, the contact area between the connectors 141*b* and 142*b* and the first ends 151*a* and 152*a* can be increased.

As illustrated in FIG. 14, when the connector 141*b* and the first end 151*a* are connected to each other, the pressing part 143 is positioned closer to the opening 113 of the case 111 and the spring part 144 is positioned closer to the bottom surface 112 than the first end 151*a*. The connector 141*b* of the first capacitor connection bus bar 141 holds the first end 151*a* of the first terminal bus bar 151 by sandwiching from the opening 113 side and the bottom surface 112 side of the case 111.

Similarly, as illustrated in FIG. 15, when the connector 142*b* and the first end 152*a* are connected to each other, the pressing part 145 is positioned closer to the opening 113 of the case 111 and the spring part 146 is positioned closer to the bottom surface 112 than the first end 152*a*. The main body 142*a* of the second capacitor connection bus bar 142 holds the first end 152*a* of the second terminal bus bar 152 by sandwiching from the opening 113 side and the bottom surface 112 side of the case 111.

When the first ends 151*a* and 152*a* have been sandwiched by the connectors 141*b* and 142*b*, the connectors 141*b* and 142*b* may be welded with the first ends 151*a* and 152*a* by irradiating the pressing parts 143 and 145 with laser.

Effects

The capacitor module 200 according to the second embodiment can manifest the following effects.

The connectors 141*b* and 142*b* respectively include the pressing parts 143 and 145 and the spring parts 144 and 146, and the first ends 151*a* and 152*a* of the terminal bus bars 151 and 152 are respectively sandwiched between the pressing part 143 and the spring part 144 and between the pressing part 145 and the spring part 146.

The pressing parts 143 and 145 are on the opening 113 side of the case 111, and the spring parts 144 and 146 are on the bottom surface 112 side of the case 111.

In this configuration, the first ends 151*a* and 152*a* are sandwiched by the pressing parts 143 and 145 and the spring parts 144 and 146, so that the contact area between the connectors 141*b* and 142*b* and the first ends 151*a* and 152*a* can be increased to reliably establish electrical connections.

Although the present disclosure has been sufficiently described in relation with preferred embodiments with reference to the accompanying drawings, various changes and modifications will be apparent to those skilled in the art. Such changes and modifications not departing from the scope of the present disclosure as set forth in the appended claims are to be construed as being included within the scope of the present disclosure. Changes in combination and order of elements in each embodiment can be realized without departing from the scope and spirit of the present disclosure.

Note that, appropriately combining those among various exemplary modifications of the embodiments described above may manifest their effects.

The present invention is useful for capacitors used in different electronic devices, electric devices, industrial devices, vehicle devices, and the like.

EXPLANATION OF REFERENCES

11, 111 case
12, 112 bottom surface
13, 113 opening
14 through hole (first through hole)
15 through hole (second through hole)
20 sealing resin
31, 32, 131 capacitor
41, 141 capacitor connection bus bar (first capacitor connection bus bar)
41*a*, 141*a* main body
41*b*, 141*b* connector
43 contact part
44 extending part
143 pressing part
144 spring part
42, 142 capacitor connection bus bar (second capacitor connection bus bar)
42*a*, 142*a* main body
42*b*, 142*b* connector
45 contact part
46 extending part
145 pressing part
146 spring part
51, 151 terminal bus bar (first terminal bus bar)
51*a*, 151*a* first end
51*b* second end
52, 152 terminal bus bar (second terminal bus bar)
52*a*, 152*a* first end
52*b* second end
61 base
62, 63 slope
100, 200 capacitor module

The invention claimed is:

1. A capacitor module comprising:
a case having a bottom surface and a side surface extending from the bottom surface to define an opening that faces the bottom surface, and the side surface including a through hole;
one or more of capacitors in the case;
a capacitor connection bus bar connected to an electrode of the one or more capacitors;
a terminal bus bar extending through the through hole, and includes a first end inside the case and a second end outside the case, the first end being connected to the capacitor connection bus bar; and
a sealing resin filled in the case,
wherein the capacitor connection bus bar includes a connector, and at least a part of the connector is inclined in a direction from the opening toward the bottom surface of the case and connected to the first end of the terminal bus bar.

2. The capacitor module according to claim 1, wherein the connector further includes a contact part that makes surface contact with the first end of the terminal bus bar, and an extending part extending from the contact part in a direction away from the terminal bus bar.

3. The capacitor module according to claim 2, wherein the extending part has a shape in which a distance from a plane on which the contact part extends is larger with increasing distance from the terminal bus bar.

4. The capacitor module according to claim 1, wherein
the connector further includes a pressing part and a spring part, and
the first end of the terminal bus bar is sandwiched between the pressing part and the spring part.

5. The capacitor module according to claim 4, wherein the pressing part is located on a first side of the terminal bus bar closer to the opening of the case, and the spring part is located on a second side of the terminal bus bar closer to the bottom surface of the case.

6. The capacitor module according to claim 5, wherein the first end of the terminal bus bar is inclined in a first direction from the bottom surface toward the opening of the case, and the pressing part is inclined in a second direction from the opening toward the bottom surface of the case.

7. The capacitor module according to claim 4, wherein the first end of the terminal bus bar is inclined in a first direction from the bottom surface toward the opening of the case, and the pressing part is inclined in a second direction from the opening toward the bottom surface of the case.

8. The capacitor module according to claim 1, wherein the connector and the first end of the terminal bus bar are connected with a weld.

9. The capacitor module according to claim 1, wherein the case includes a base located closer to the bottom surface than the through hole, and the first end of the terminal bus bar is on the base.

10. The capacitor module according to claim 9, wherein the base is located so as to sandwich the through hole, and includes sloped surfaces inclined toward the through hole.

11. The capacitor module according to claim 1, wherein
the through hole is a first through hole, the side surface of the case includes a second through hole, the capacitor connection bus bar is a first capacitor connection bus bar, and the electrode is a first electrode, the capacitor module further comprising:
a second capacitor connection bus bar connected to a second electrode of the one or more capacitors; and
a second terminal bus bar extending through the second through hole, and includes a third end inside the case and a fourth end outside the case, the third end being connected to the second capacitor connection bus bar,
wherein the second capacitor connection bus bar includes a second connector, and at least a part of the second connector is inclined in a direction from the opening toward the bottom surface of the case and connected to the third end of the second terminal bus bar.

12. The capacitor module according to claim 11, wherein
the first connector further includes a first contact part that makes surface contact with the first end of the first terminal bus bar, and a first extending part extending from the first contact part in a direction away from the first terminal bus bar, and
wherein the second connector further includes a second contact part that makes surface contact with the third end of the second terminal bus bar, and a second extending part extending from the second contact part in a direction away from the second terminal bus bar.

13. The capacitor module according to claim 12, wherein the first extending part has a shape in which a distance from a plane on which the first contact part extends is larger with increasing distance from the first terminal bus bar, and the second extending part has a shape in which a distance from a plane on which the second contact part extends is larger with increasing distance from the second terminal bus bar.

14. The capacitor module according to claim 11, wherein the first connector further includes a first pressing part and a first spring part, and the first end of the first terminal bus bar is sandwiched between the first pressing part and the first spring part, and the second connector further includes a second pressing part and a second spring part, and the third end of the second terminal bus bar is sandwiched between the second pressing part and the second spring part.

15. The capacitor module according to claim 14, wherein the first pressing part is located on a first side of the first terminal bus bar closer to the opening of the case, and the first spring part is located on a second side of the first terminal bus bar closer to the bottom surface of the case, and the second pressing part is located on a first side of the second terminal bus bar closer to the opening of the case, and the second spring part is located on a second side of the second terminal bus bar closer to the bottom surface of the case.

16. The capacitor module according to claim 15, wherein the first end of the first terminal bus bar is inclined in a first direction from the bottom surface toward the opening of the case, and the first pressing part is inclined in a second direction from the opening toward the bottom surface of the case, and the third end of the second terminal bus bar is inclined in the first direction from the bottom surface toward the opening of the case, and the second pressing part is inclined in the second direction from the opening toward the bottom surface of the case.

17. The capacitor module according to claim 14, wherein the first end of the first terminal bus bar is inclined in a first direction from the bottom surface toward the opening of the case, and the first pressing part is inclined in a second direction from the opening toward the bottom surface of the case, and the third end of the second terminal bus bar is inclined in the first direction from the bottom surface toward the opening of the case, and the second pressing part is inclined in the second direction from the opening toward the bottom surface of the case.

18. The capacitor module according to claim 11, wherein the first connector and the first end of the first terminal bus bar are connected with a first weld, and the second connector and the third end of the second terminal bus bar are connected with a second weld.

19. The capacitor module according to claim 11, wherein the case includes a base located closer to the bottom surface than the first through hole and the second through hole, and the first end of the first terminal bus bar and the third end of the second terminal bus bar are on the base.

20. The capacitor module according to claim 19, wherein the base is located so as to sandwich the first through hole and the second through hole, and includes first sloped surfaces inclined toward the first through hole and second sloped surfaces inclined toward the second through hole.

* * * * *